C. T. KING.
TRAP NEST.
APPLICATION FILED JAN. 9, 1915.

1,184,965.

Patented May 30, 1916.
3 SHEETS—SHEET 1.

C. T. KING.
TRAP NEST.
APPLICATION FILED JAN. 9, 1915.
1,184,965.
Patented May 30, 1916.
3 SHEETS—SHEET 2.
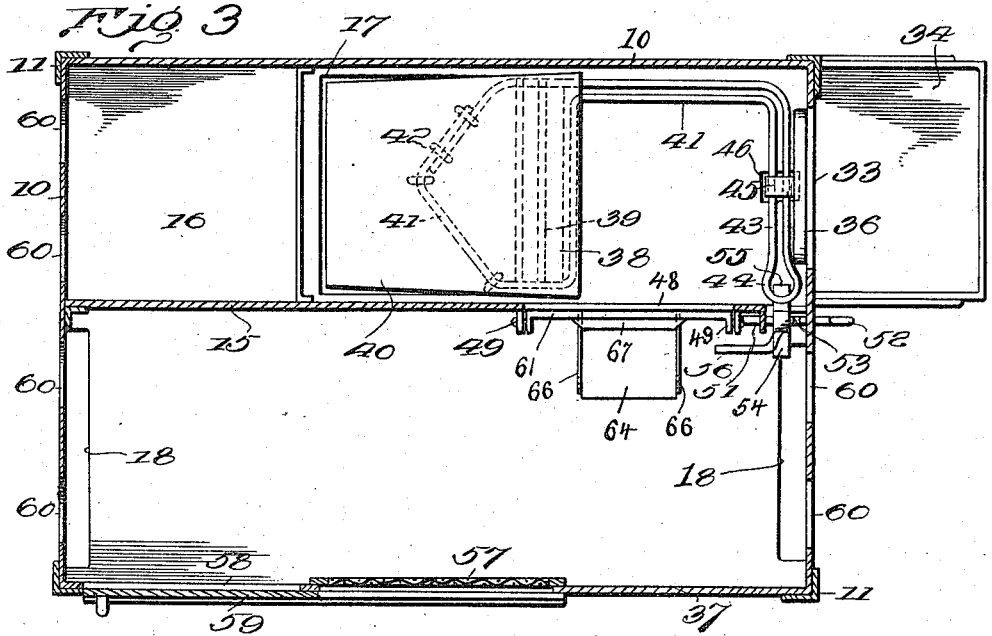
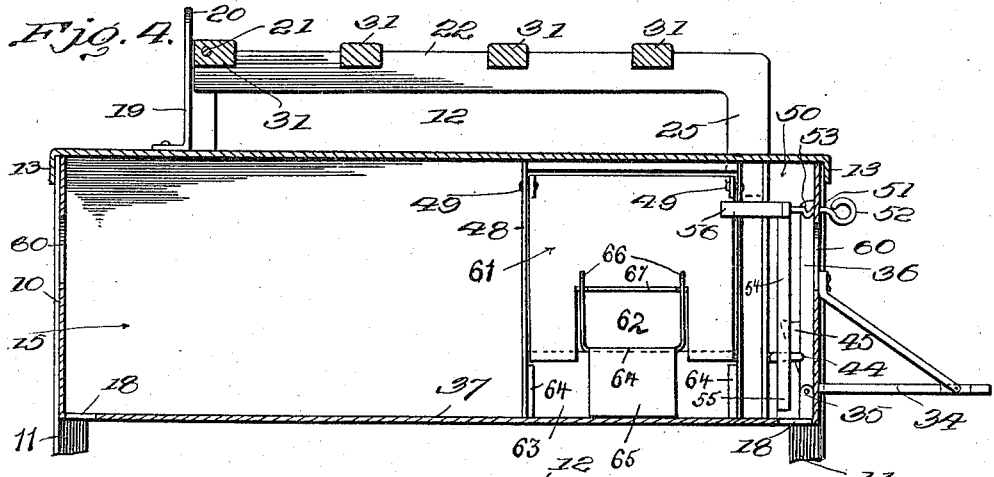
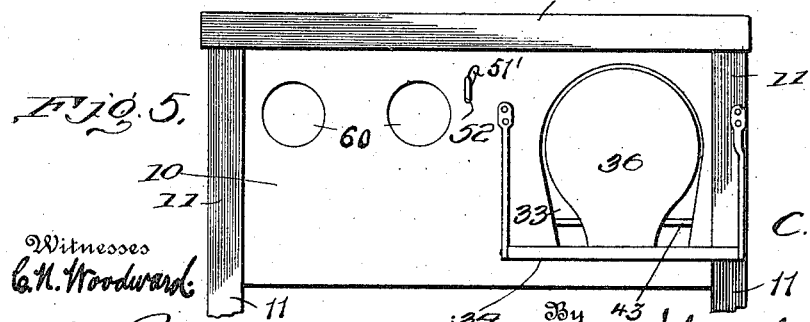
Inventor
C. T. King
Witnesses
Attorney

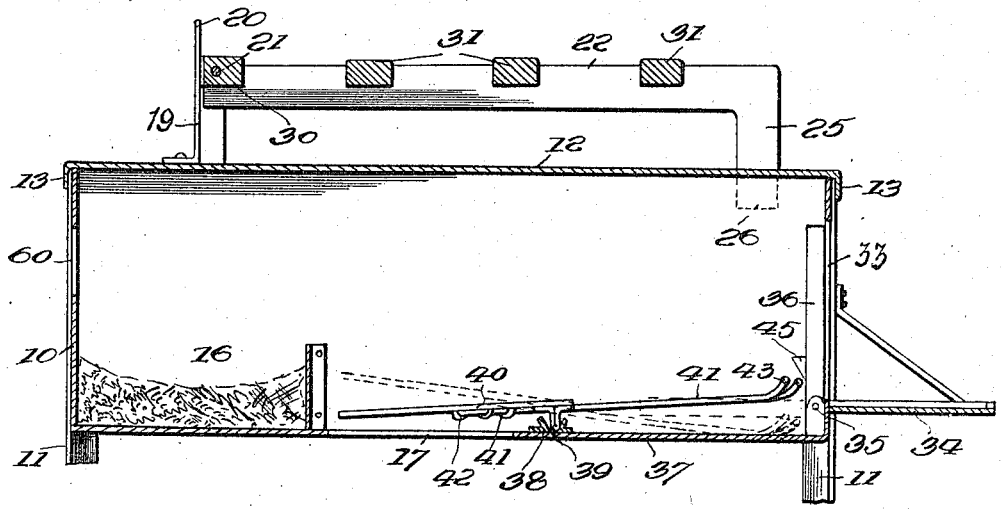
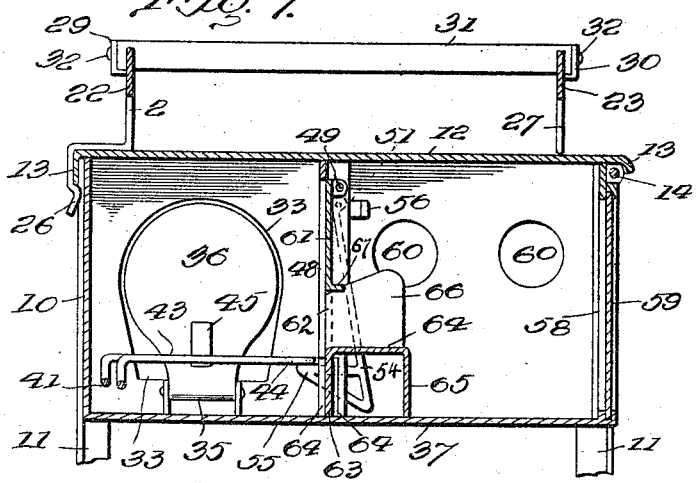
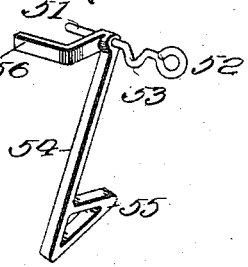
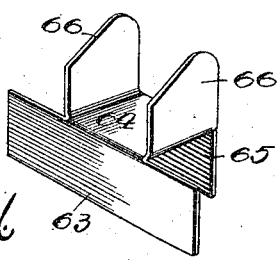

UNITED STATES PATENT OFFICE.

CHARLES T. KING, OF MOLINE, ILLINOIS, ASSIGNOR OF ONE-FOURTH TO HORACE M. ANDERSON, OF MOLINE, ILLINOIS.

TRAP-NEST.

1,184,965.　　　　Specification of Letters Patent.　　Patented May 30, 1916.

Application filed January 9, 1915.　Serial No. 1,376.

*To all whom it may concern:*

Be it known that I, CHARLES T. KING, a citizen of the United States, residing at Moline, in the county of Rock Island and State of Illinois, have invented certain new and useful Improvements in Trap-Nests, of which the following is a specification.

This invention relates to improvements in hens' nests of the class known as trap nests, and has for one of its objects to improve the construction and increase the utility and efficiency of devices of this character.

Another object of the invention is to provide a simply constructed trap nest arranged with an inlet opening and an outlet opening, of a closure for the inlet opening operative by the hen in passing to the nest, and means operative by the hen in passing through the outlet opening to release the closure of the inlet.

Another object of the invention is to provide a simply constructed device, whereby the tripping mechanism for the outlet is rendered inoperative.

Another object of the invention is to provide a simply constructed device having a nest compartment and a compartment in which the hens assemble after the eggs are laid, the nest containing compartment having an inlet opening provided with a closure, a passage between the two compartments, and means operative by the hen in passing to the nest for closing the inlet, and means operative by the hen in passing to the assembly compartment to release the closure to the nest compartment.

With these and other objects in view, the invention consists in certain novel features of construction as hereinafter shown and described and then specifically pointed out in the claims; and in the drawings illustrative of the preferred embodiment of the invention, Figure 1 is a side elevation of the improved device; Fig. 2 is a plan view of the improved device; Fig. 3 is a horizontal section on the line 3—3 of Fig. 1; Fig. 4 is a section on the line 4—4 of Fig. 2. Fig. 5 is an end elevation from the inlet end. Fig. 6 is a section on the line 6—6 of Fig. 2. Fig. 7 is a transverse section on the line 7—7 of Fig. 1, looking toward the intake end of the device. Fig. 8 is a perspective detail of the swinging release member. Fig. 9 is a detached perspective detail of the removable portion of the partition between the nest compartment and the assembling compartment.

Corresponding and like parts are referred to in the following description and indicated in all the views of the accompanying drawings by the same reference characters.

The improved device may be constructed of any suitable material and may be of any suitable size, but is preferably constructed of sheet metal, such as galvanized iron, or any other suitable metal, and of oblong shape, and divided into two compartments by a central longitudinal partition.

The body portion of the device is represented conventionally at 10 and preferably spaced above the ground by combined corner posts and supports 11, the latter being preferably formed of L-bars, as shown. The improved device is likewise provided with a closure, represented as a whole at 12, and preferably formed with downturned flanged margins, indicated at 13, and hinged at 14 to one pair of the corner posts 11, so that the cover or top may be turned back to expose the interior of the casing for cleansing the same, for the removal of the eggs, or for other purposes. The interior of the casing is divided into two compartments by a longitudinal partition 15, the nest, indicated at 16, being located at one end of one of the compartments as shown. For the purpose of this description, the compartment containing the nest will be referred to as the nest compartment, while the other compartment at the opposite side of the partition is designated the assembling compartment, as the hens gather in this second compartment after the laying operation and from this they are permitted to escape as hereinafter explained.

A relatively large opening, indicated at 17, is formed in the floor of the nest compartment while smaller openings 18 are formed at the ends of the assembling compartment, as indicated in Figs. 3, 4 and 5, to facilitate the cleansing of the casing or inclosure. Rising from the top or cover 12 are standards 19 spaced apart, each standard having an upwardly directed extension 20. Pivoted at 21 to one of the standards is a side member 22 of a perch device, while a similar side member 23 is pivoted at 24 to the other standard 19. At its forward end the side member 22 is directed downwardly, as represented at 25, and thence turned laterally and bent downwardly as shown in Fig. 6, and formed with a terminal catch 26 to engage the edge of the downturned flange 13 of the top. By this means the member 25 is yieldably coupled to the top 12, as represented in Fig. 6. The side member 23 is likewise downturned, as shown at 27, and bears by its lower end upon the upper face of the top member 12. At spaced intervals clefts are cut in the side member 22 and the material between the clefts bent outwardly and thence upwardly to form tongues, as indicated at 29, while similar clefts are formed at spaced intervals in the side member 23 and the portion between the clefts bent outwardly to form tongues 30. By this means seats are formed at spaced intervals in the members 22—23 to receive perches 31, the ends of the perches being supported by the upwardly directed portions of the tongues 29—30 and to which device they are secured by pins or other suitable fastening devices 32. The pivots 21—24 extend through the upper portions of the standards 19 and thence through the tongues 29—30 of the adjacent perch 31, as represented in Fig. 2. By this simple arrangement, a perch device is produced which is spaced above the top 12 and hingedly supported so that it can be turned to one side for the cleansing of the top at suitable intervals.

The catch 26 will be sufficiently strong to hold the perch device in position when the cover or top 12 is tilted upon the hinge 14.

Suitable ventilating apertures 60 are formed in the compartments of the casing.

Formed in the nest compartment at the end opposite to the nest, is a relatively large opening 33, and connected to the casing is a landing platform 34 opposite the intake opening 33. Hinged, at 35, in the lower side of the nest compartment is a closure 36 which covers the opening 33 when in upper position, as indicated in Figs. 3, 4, 5, 6 and 7 and uncovers the intake opening when in lowered position, as indicated in Fig. 6 in dotted lines.

Rising from the bottom, indicated at 37, is a channel member 38 in which a rib 39 is mounted to swing. Connected to the rib 39 is a platform 40, the platform being located between the nest 16 and the intake entrance 33 of the nest compartment. By this arrangement the platform 40 is mounted to tilt to a limited extent and extends over the relatively large opening 17, as shown in Fig. 6. Connected to the member 40 is an arm, represented as a whole at 41, the arm being preferably formed of relatively heavy wire bearing beneath the member 40 and secured thereto by staples or like devices, indicated at 42. The member 41 is distended and arranged to bear over a relatively large portion of the under face of the platform 40 to assist in supporting the platform and increasing its strength and durability. The arm 41 is extended toward the intake end of the nest compartment at one side and thence turned and extended at right angles to the body of the arm and in parallel relation to the closure 36 and the front of the casing, as shown at 43, and preferably terminates in a loop or eye 44, the latter being thus disposed close to the partition 15, as shown in Fig. 3.

A block 45 is connected to the inner face of the closure 36 is positioned to be engaged by the portion 43 of the arm, as hereinafter explained.

The platform 40 and the arm 41—43 are so arranged that when the platform is tilted or disposed in its lowered position, as shown in full lines in Fig. 6, the portion 43 of the arm will engage the block 45 and hold the closure 36 in its elevated or vertical position, and then when the platform is elevated or disposed in the position shown by dotted lines in Fig. 6, the arm 41—43 will be depressed as shown by dotted lines and permit the closure 36 to fall by gravity into open position, an opening 46 being formed in the bottom 37 to receive the block 45 and thus permit the closure 36, when in opened position to lie close to the bottom 37.

The partition 15 is formed with a relatively narrow opening, indicated at 50, and mounted for rotation transversely of the opening 50 is a rod 51 having an operating ring 52 at the outer end externally of the casing. The rod is provided with a cranklike offset 53 intermediate its ends, as illustrated in Fig. 8. Attached to the rod 51 and movable therewith is a downwardly directed arm 54 having a lateral projection or barb 55 at its lower end, the barb extending at its point into the path of the terminal loop 44 of the closure operating arm, as indicated in Figs. 3 and 7.

Formed through the partition 15 near the intake end of the casing is a relatively large opening, indicated at 48. Pivoted at 49 in the opening 48 is a swinging member 61 having a recess 62 in its lower edge and forming a relatively small opening between the nest compartment and the assembling compartment. Extending transversely of the opening 48 at its lower part, is a division member 63 received at its ends in guide cleats 64 and thereby detachably supported and forming a part of the main partition 15.

The lower ends of the swinging member 61 at each side of the recess or opening 62 bear against the assembling compartment side of the divisional member 63, so that while the member 61 is free to swing into the assembling compartment, it is prevented from swinging into the nest compartment, as will be obvious.

Extending from the division member 63 at its upper edge is a guard device including a horizontal portion 64 which projects for a distance into the assembling compartment and is supported at the outer end by a vertical portion 65. Wings or guards 66 rise from the side edges of the portion 64 and extend at one end through the opening 62. At the upper edge of the opening 62 the member 61 is formed with a lip 67 which extends between the guards 66 and coöperates therewith to prevent a hen from attempting to pass through the small opening into the nest compartment.

The members 63—64—65 and 66 are preferably formed from a single piece of sheet metal, as shown in Fig. 9.

Extending laterally from the upper end of the member 54 is another and shorter arm 56 which extends into the path of the member 61 when the rod 51 is in its inner position and is moved out of the path of the member 61 when the rod is in its outer position. The rod 51 is movable endwise and the opening therefor in the casing 10 is slotted vertically as shown at 51' so that when the portion of the rod between the eye 52 and the offset 53 bears upon the bottom of the slot in the casing, the members 54—56 will be in their inner position, or, with the points of the barb 55 beneath the eye 44 and the shorter arm 56 in the path of the member 61, and then when the rod is moved to its outer position, with the portion between the arm 54 and the offset 53 engaged with the casing at the bottom of the slot, the shorter arm 56 will be withdrawn from the path of the member 61, the object to be hereafter explained.

A relatively large ventilating opening is formed through the side wall of the assembling compartment and covered by a screen, indicated at 57. A relatively large opening 58 is formed in the outer wall of the assembling compartment and covered by a slide 59 to provide means for the escape of the hens from the assembling compartment.

With the device thus constructed, the operation is as follows: Assuming that the closure 36 is in its opened position and the platform 40 in its elevated position as indicated by dotted lines in Fig. 6, the hen entering through the opening 33 and passing to the nest 16 depresses the platform 40 and elevates the portion 43 of the arm 41 and moves the closure 36 into closed position, the portion 43 of the arm engaging the block 45, as shown in Fig. 6, and thus holding the closure 36 in its upper or vertical position. As the arm 41 is elevated, the eye 44 engages the lower inclined face of the barb 55 and moves the arm 54 outwardly and passes upwardly above the barb, which immediately passes beneath the loop 44 by gravity and thus locks the arm 41—43 and prevents any inward movement of the closure 36 and thus effectually protects the hen while on the nest from disturbance by the other hens. After the laying operation, the hen passes from the nest and cannot pass through the opening 33 as the closure 36 is in its elevated position, and the only exit for the hen is through the opening 48 partially covered by the member 61. The hen in attempting to pass through the opening 48 thrusts her head through the recess 62 and displaces the member 61 and moves the latter inwardly and causes it to engage the arm 56 and this swings the arm 54 into the assembling compartment and detaches the barb 55 from the loop 44 of the arm 43, permitting the latter to drop by gravity and releases the closure 36, which falls into the position shown in dotted lines in Fig. 5, thus uncovering the opening 33 to enable the next hen to reach the nest, the operation of the closure 36 being repeated as the second hen passes to the nest, and so on continuously. As fast as the hen lays the egg, she passes into the assembling compartment and is kept separate from the hens who have not yet visited the nest. The assembling compartment may be of any desired size to contain any desired number of hens, who may be removed as often as required through the opening 58, as before described.

The platform 40 with its attached arm 41—43 and the rib 39 may be lifted out when required for cleansing or repairs.

The parts of the invention are separable so that all parts of the casing may be reached for cleansing and fumigation and are preferably constructed wholly of metal.

Having thus described the invention, what is claimed as new, is:—

1. An apparatus of the class described, comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure for actuating the same and holding it in closed position, a member adapted to be displaced by the hen in passing through the outlet, a catch device engaging the inlet closure holding means, and means whereby said catch device is released by the displaced member.

2. An apparatus of the class described comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure for actuating the same and holding it in closed position, a catch device in position to engage said closure holding member, and a movable member adapted to be displaced by the hen in passing through the outlet and engaging the catch device to release the inlet closure holding member therefrom at its outward movement.

3. An apparatus of the class described comprising an inclosure having an inlet and an outlet, a nest within the inclosure, a movably supported closure for the inlet, means adapted to be operated by a hen in passing to the nest for actuating said inlet closure, a member adapted to be operated by a hen in passing through the outlet, a catch device engaging the inlet closure actuating means and extending into the path of the hen operated outlet member, and means connected to the catch device for moving the same out of the path of the outlet member.

4. An apparatus of the class described comprising an inclosure having an inlet and an outlet, a nest within the inclosure, a movably supported closure for the inlet, means operative by a hen in passing to the nest for closing said inlet closure and including a member directed transversely of the same and holding it closed when in one position, a catch device in position to engage said transversely directed member, and a movable member adapted to be displaced by the hen in passing through the outlet, said movable member operating through the path of the catch device to release the inlet closure holding means therefrom when said hen displaced means reaches a pretetermined position in its movement.

5. An apparatus of the class described comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure and actuating the same and holding it in closed position, a catch device in position to engage said closure holding member, a movable member adapted to be displaced by the hen in passing through the outlet and adapted to engage the catch device to release the inlet closure holding member therefrom when actuated, and means for removing the catch device from the path of the movable member.

6. An apparatus of the class described comprising an inclosure having an inlet and an outlet, a nest within the inclosure, a movably supported closure for the inlet, means operative by a hen in passing to the nest for closing said inlet closure and holding it in closed position, a catch device in position to engage said closure holding means, a guard device including spaced sides and disposed above said outlet, a movable member adapted to be displaced by a hen in passing through the outlet and movable over the guard device, and an arm extending from said catch device into the path of said movable member.

7. An apparatus of the class described comprising an inclosure having a division member forming a nest compartment and an assembling compartment, said division member having an opening, a guard device removably disposed in said opening in the division member and including a horizontal portion and spaced vertical sides, and a member movably connected to said division member and swinging over the opening thereof and provided with a recess normally above said guard device.

8. An apparatus of the class described comprising an inclosure having a division member forming a nest compartment and an assembling compartment, said division member having an opening, a member removably disposed in the opening in the division member and having a stationary platform provided with vertical guides spaced apart and extending into the assembling compartment, and a member movably connected to said division member and swinging over the opening thereof and provided with a recess above the stationary platform.

9. An apparatus of the class described comprising an inclosure having a division member forming a nest compartment and an assembling compartment, said nest compartment having an inlet, said assembling compartment having an outlet, and said division member having an opening, a guard device removably disposed in the opening in the division member and including a horizontal portion and spaced sides, a member movably connected to said division member and swinging over the opening thereof and provided with a recess normally above the guard device, and a movable closure for the outlet of the assembling compartment.

10. An apparatus of the class described comprising an inclosure having a member dividing the inclosure into a nest compartment and an assembling compartment, said nest compartment having an inlet, said assembling compartment having an outlet and said division member having an opening, a movable closure for the inlet of the nest compartment, a movable closure for the outlet of the assembling compartment, means operative by a hen in passing through the nest compartment to close the inlet closure, a guard device removably disposed in the opening in the division member and including a horizontal portion and spaced sides, a member movably connected to said division member and swinging over the opening thereof and provided with a recess above the stationary platform, and a catch device engaging the inlet closure operating means and having an arm extending into the path of the recessed movable member and operative thereby to release the inlet closure.

11. An apparatus of the class described comprising an inclosure having a member dividing the inclosure into a nest compartment and an assembling compartment, said nest compartment having an inlet, said assembling compartment having an outlet and said division member having an opening, a movable closure for the inlet of the nest compartment, a movable closure for the outlet of the assembling compartment, means operative by a hen in passing through the nest compartment to close the inlet closure, a member removably disposed in the opening in the division member and having a stationary platform extending into the assembling compartment, a member movably connected to said division member and swinging over the opening thereof and provided with a recess above the stationary platform, a catch device engaging the inlet closure operating means and having an arm extending into the path of the recessed movable member and operative thereby to release the inlet closure, and means for disposing such catch device out of the path of the recessed movable member.

In testimony whereof I affix my signature in presence of two witnesses.

CHARLES T. KING. [L. s.]

Witnesses:
GASTON VEYS,
O. W. SWENSSON.

Copies of this patent may be obtained for five cents each, by addressing the "Commissioner of Patents, Washington, D. C."